United States Patent
Park et al.

(10) Patent No.: US 9,061,745 B2
(45) Date of Patent: Jun. 23, 2015

(54) CRUISE SHIP

(75) Inventors: Jae Woo Park, Changwon-si (KR);
Chul Ho Lee, Changwon-si (KR);
Taeseok Jeong, Gimhae-si (KR); Joo Ho Heo, Seoul (KR)

(73) Assignee: STX Offshore & Shipbuilding Co., Ltd., Changwon-Si (KR)

( * ) Notice: Subject to any disclaimer, the term of this patent is extended or adjusted under 35 U.S.C. 154(b) by 0 days.

(21) Appl. No.: 14/128,771

(22) PCT Filed: Jan. 5, 2012

(86) PCT No.: PCT/KR2012/000115
§ 371 (c)(1),
(2), (4) Date: Dec. 23, 2013

(87) PCT Pub. No.: WO2013/002466
PCT Pub. Date: Jan. 3, 2013

(65) Prior Publication Data
US 2014/0123887 A1    May 8, 2014

(30) Foreign Application Priority Data

Jun. 28, 2011   (KR) .................. 10-2011-0062645

(51) Int. Cl.
*B63B 3/00* (2006.01)
*B63B 5/00* (2006.01)
*B63B 9/06* (2006.01)
*B63B 35/44* (2006.01)
*E04H 3/14* (2006.01)
*B63B 29/02* (2006.01)

(52) U.S. Cl.
CPC *B63B 35/44* (2013.01); *E04H 3/14* (2013.01); *B63B 29/02* (2013.01); *B63B 2035/4426* (2013.01)

(58) Field of Classification Search
CPC  B63B 29/00; B63B 29/02; B63B 2035/4426; B63B 35/44; E04H 3/14
USPC ................. 114/65 R, 66, 71, 78, 85
See application file for complete search history.

(56) References Cited

U.S. PATENT DOCUMENTS

| | | | |
|---|---|---|---|
| 1,088,239 A * | 2/1914 | Paine ................. | 114/65 R |
| 6,755,143 B2 * | 6/2004 | Mermier et al. ........... | 114/65 R |
| 7,156,031 B2 * | 1/2007 | Mermier et al. ........... | 114/56.1 |
| 2003/0075090 A1 | 4/2003 | Mermier et al. | |
| 2003/0075092 A1 | 4/2003 | Mermier et al. | |
| 2007/0022932 A1 | 2/2007 | Mermier et al. | |

FOREIGN PATENT DOCUMENTS

| | | |
|---|---|---|
| JP | 05-154256 A | 6/1993 |
| JP | 07-127295 A | 5/1995 |
| KR | 10-0972464 B1 | 7/2010 |
| KR | 10-2011-0062645 | 6/2011 |
| WO | WO-2007-020676 A1 | 2/2007 |
| WO | WO-2013-002466 A1 | 1/2013 |

OTHER PUBLICATIONS

International Preliminary Report on Patentability issued Jan. 7, 2014 for PCT/KR2012/000115, which was filed on Jan. 5, 2012 and published as WO 2013/002466 on Jan. 3, 2013 (Inventor—Park; Applicant—STX Offshore & Shipbuilding Co., Ltd.;) (pp. 1-7).
International Search Report issued Aug. 14, 2012 for PCT/KR2012/000115, which was filed on Jan. 5, 2012 and published as WO 2013/002466 on Jan. 3, 2013 (Inventor—Park; Applicant—STX Offshore & Shipbuilding Co., Ltd.;) (pp. 1-2).
Written Opinion issued Aug. 14, 2012 for PCT/KR2012/000115, which was filed on Jan. 5, 2012 and published as WO 2013/002466 on Jan. 3, 2013 (Inventor—Park; Applicant—STX Offshore & Shipbuilding Co., Ltd.;) (pp. 1-6).

* cited by examiner

*Primary Examiner* — Daniel V Venne
(74) *Attorney, Agent, or Firm* — Ballard Spahr LLP

(57) ABSTRACT

The present invention relates to a cruise ship having a body on which rooms are formed and a stadium having stands and a ground formed thereon.

4 Claims, 6 Drawing Sheets

CRUISE SHIP

CROSS REFERENCE TO RELATED APPLICATIONS

The present application is a National Phase Application of International Application No. PCT/KR2012/000115, filed Jan. 5, 2012, which claims priority to Korean Patent Application No. 10-2011-0062645, filed Jun. 28, 2011, which applications are incorporated herein fully by this reference.

TECHNICAL FIELD

The present invention relates to a cruise ship, and more particularly, to a cruise ship having a stadium provided thereon.

BACKGROUND ART

Generally, a cruise ship is a passenger ship used for pleasure voyages.

Lots of people have been recently interested in cruise travel all over the world, and for the cruise travel, large-sized high quality cruise ships are generally used.

The cruise ship has rooms and various facilities for living and leisure such as a restaurant, swimming pool, casino, indoor golf exercise center, ice rink, theater, tennis court and the like. In designing the cruise ship, it is very important to provide many conveniences in use for the rooms and various facilities arranged in the cruise ship to passengers of the cruise ship. To do this, it is necessary to optimize a degree of utilization of space in the cruise ship.

That is, the cruise ship means a gorgeous resort in which all kinds of foods and pleasures are provided, and further, it means a floating hotel in which about 1,000 passengers are accommodated.

Accordingly, many shipping companies in all countries show a lot of interest in the cruise ships creating high values, and more than 90% market share in the cruise ship is represented by European shipping companies. Contrarily, Korean shipping companies keep the top of the market share in commercial vessels such as liquefied natural gas carriers, oil carriers and the like, but they do not enter cruise markets yet.

However, a conventional cruise ship does not have any large-sized stadium like a soccer stadium.

In the conventional cruise ship, that is, it is hard to open a variety of soccer sports games or performances through which the structure of earnings can be expanded when the large-sized stadium is provided in the cruise ship.

Accordingly, there is a definite need for the development of a novel cruise ship having a large-sized stadium like a soccer stadium located thereon, thus providing high values.

DISCLOSURE

Technical Problem

Accordingly, the present invention has been made in view of the above-mentioned problems occurring in the prior art, and it is an object of the present invention to provide a cruise ship that has a large-sized stadium like a soccer stadium disposed thereon, thus providing high values.

It is another object of the present invention to provide a cruise ship that has a large-sized stadium formed as a floating body.

Technical Solution

To accomplish the above-mentioned objects, according to the present invention, there is provided a cruise ship including: a body on which rooms are included; and a stadium having stands and a sports field included thereon.

According to the present invention, preferably, the stadium is located in a section of the body along the longitudinal direction of the body, the sports field is formed depressedly toward the bottom of the body, and the stands are inclined upward from the sports field.

According to the present invention, preferably, the stadium further includes rooms formed along the outer edges thereof, and the rooms of the stadium are connected to the stands.

According to the present invention, preferably, the stadium is comprised of a separate floating body and is separable from the body.

According to the present invention, preferably, a body is connected to each side of the stadium.

According to the present invention, preferably, the stadium has open portions formed on both sides facing the bodies.

According to the present invention, preferably, the bodies have rooms formed on the portions facing the open portions of the stadium.

According to the present invention, preferably, the stadium is closed on the entire portion thereof except a portion of the center of the top surface and the open portions thereof.

According to the present invention, preferably, a roof is located over the stands and rooms of the stadium.

According to the present invention, preferably, the roof has a through-hole portion formed thereon, and frames are transversely disposed on the through-hole portion.

Advantageous Effects

According to the present invention, the cruise ship has the large-sized stadium like a soccer stadium installed thereon, providing high values.

That is, the structure of earnings can be expanded through a variety of soccer sports games or performances conducted on the stadium of the cruise ship.

Further, the stadium is comprised of a floating body and connectable to the two bodies when the sports game or performance is provided, thus minimizing the fluctuation caused by waves or swells.

At this time, the passengers of the cruise ship move to the stadium so as to watch the sports game or performance conducted on the stadium.

Furthermore, the stadium has the open portions formed on both sides facing the bodies, and therefore, the passengers of the bodies can watch the sports game or performance conducted on the stadium through the rooms of the bodies facing the open portions of the stadium, without moving to the stadium.

Additionally, the roof is located over the stands and rooms of the stadium so as to protect the stands from sunlight or rain drops.

MODE FOR INVENTION

Hereinafter, an explanation on a cruise ship according to preferred embodiments of the present invention will be in detail given with reference to the attached drawings.

Figure 1:
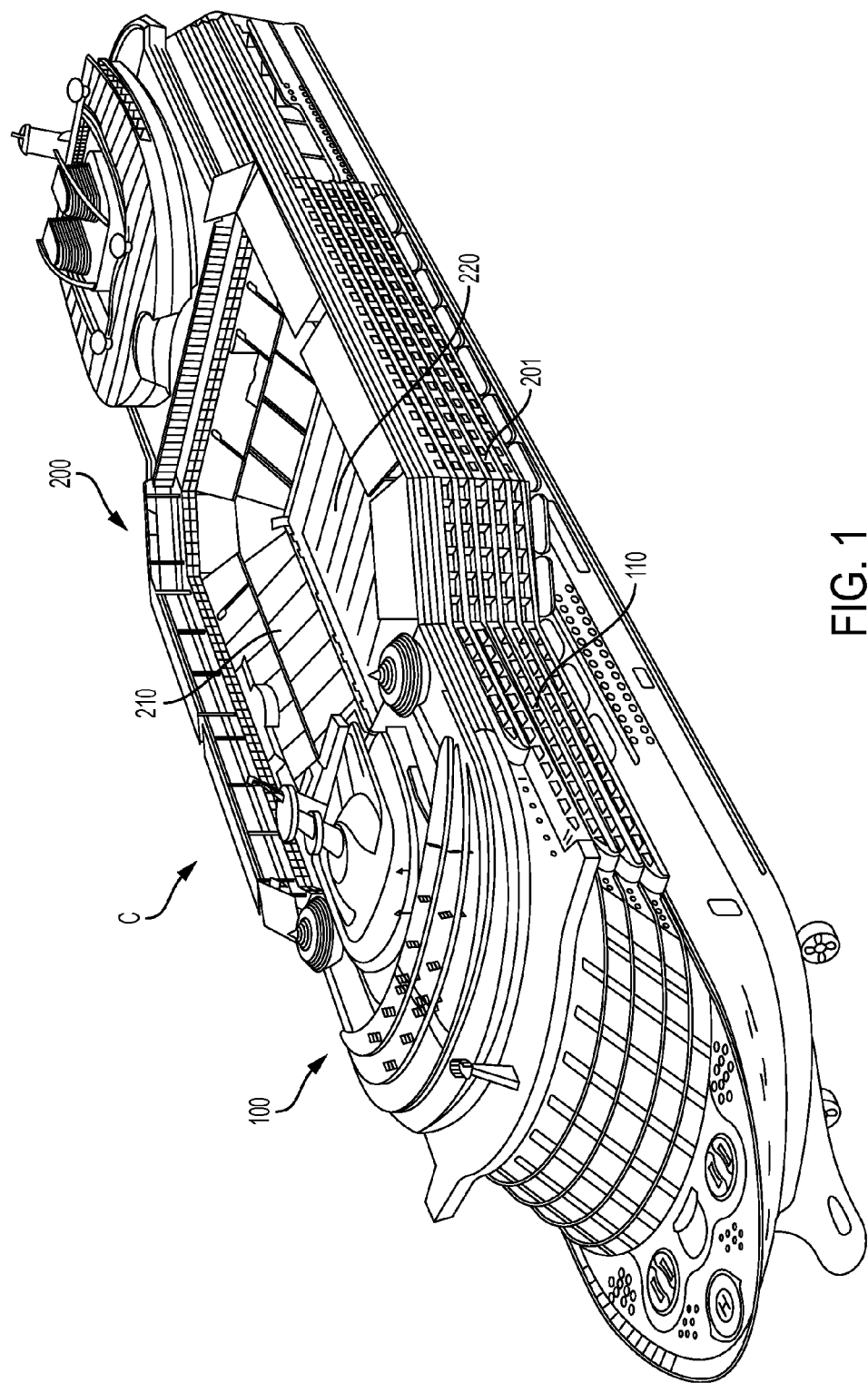
FIG. 1 is a perspective view showing a cruise ship according to a first embodiment of the present invention.
Figure 2:
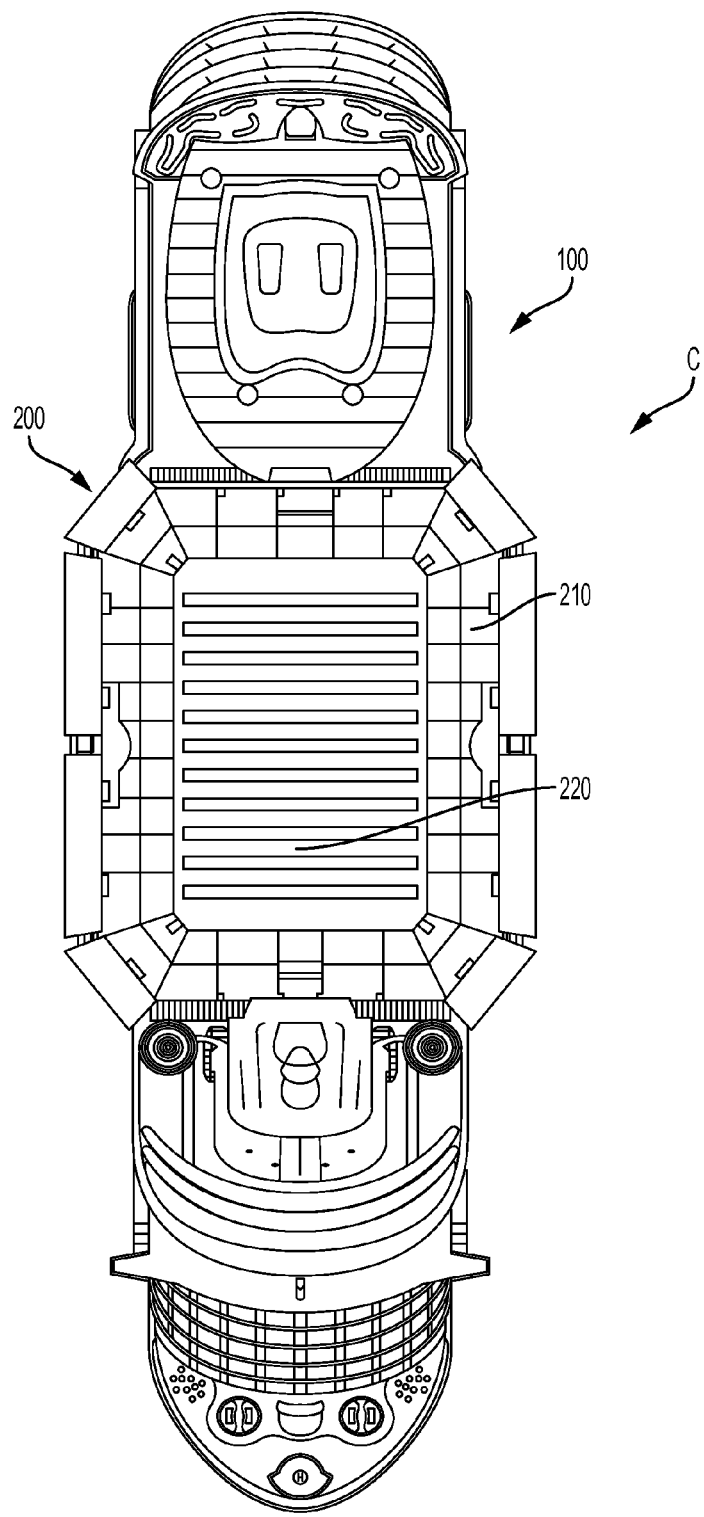
FIG. 2 is a side view of FIG. 1.
Figure 3:
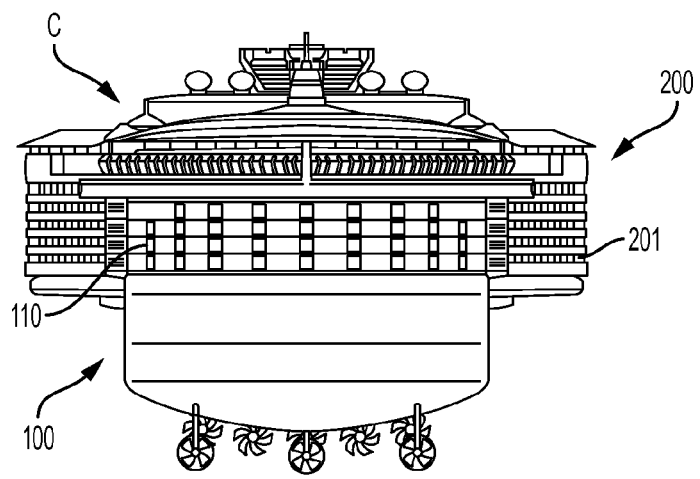
FIG. 3 is a plan view of FIG. 1.
Figure 4:
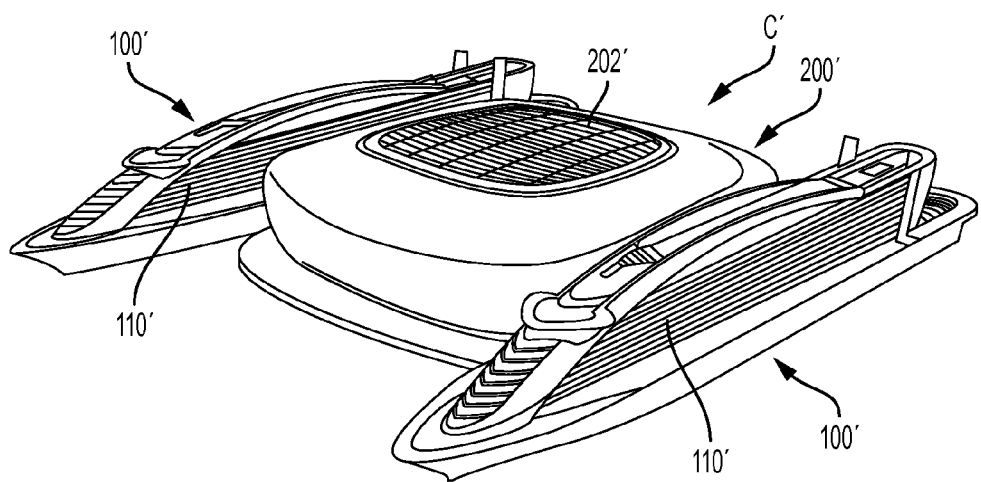
FIG. 4 is a perspective view showing a cruise ship according to a second embodiment of the present invention.
Figure 5:
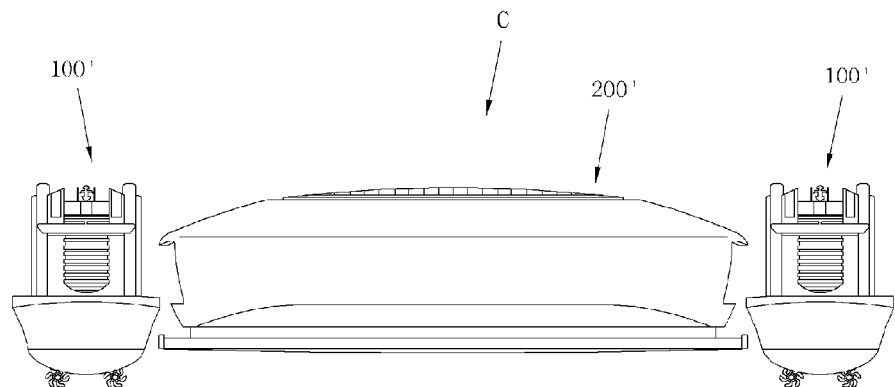
FIG. 5 is a front view of FIG. 4.
Figure 6:
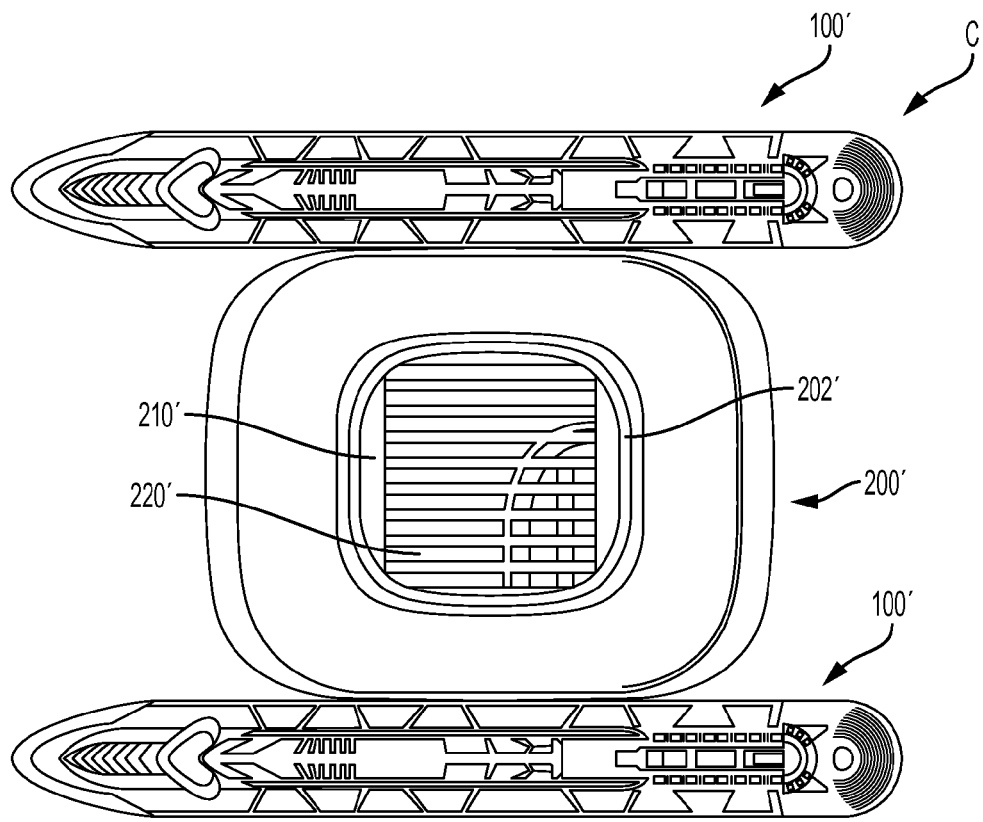
FIG. 6 is a plan view of FIG. 4.
Figure 7:
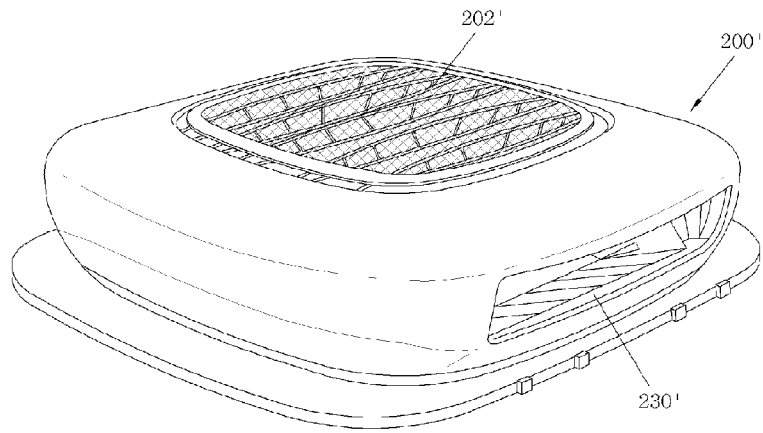
FIG. 7 is a perspective view showing the stadium of FIG. 4.
Figure 8:
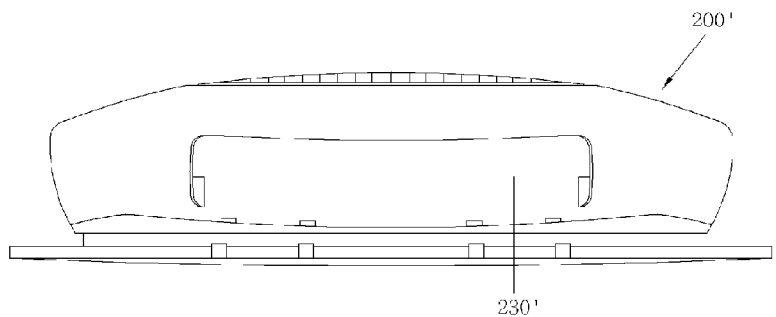
FIG. 8 is a side view of FIG. 7.
Figure 9:
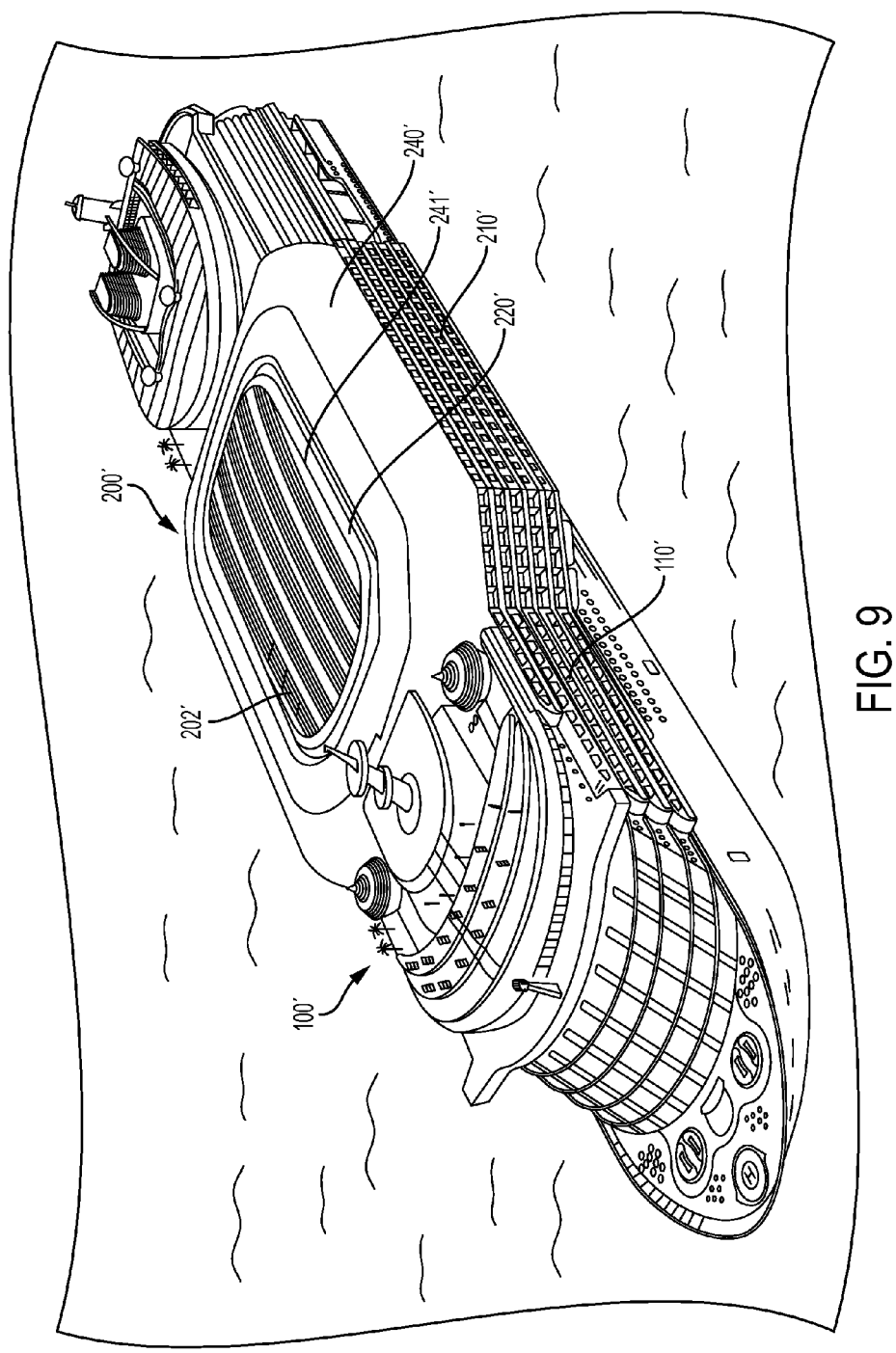
FIG. 9 is a perspective view showing a cruise ship according to a third embodiment of the present invention.

FIG. 1 is a perspective view showing a cruise ship according to a first embodiment of the present invention, FIG. 2 is a side view of FIG. 1, FIG. 3 is a plan view of FIG. 1, FIG. 4 is a perspective view showing a cruise ship according to a second embodiment of the present invention, FIG. 5 is a front view of FIG. 4, FIG. 6 is a plan view of FIG. 4, FIG. 7 is a perspective view showing the stadium of FIG. 4, FIG. 8 is a side view of FIG. 7, and FIG. 9 is a perspective view showing a cruise ship according to a third embodiment of the present invention.

First Embodiment of the Present Invention

As shown in FIGS. 1 to 3, a cruise ship C according to a first embodiment of the present invention includes: a body 100 on which rooms 110 are included; and a stadium 200 having stands 210 and a sports field 220 included thereon.

First, the body 100 of the cruise ship C has the rooms 110 and various facilities for living and leisure such as a restaurant, swimming pool, casino, indoor golf exercise center, ice rink, theater, tennis court and the like.

The body 100 is generally provided in conventional cruise ships, and therefore, an explanation of the internal structure and operation of the body 100 of the cruise ship C will be avoided for the brevity of the description.

Further, the stadium 200 is located in a section of the body 100 along the longitudinal direction of the body 100. The sports field 220 is formed depressedly toward the bottom of the body 100, and the stands 210 are inclined upward from the sports field 220.

Accordingly, the stadium 200 has the same shape as the stadium as a structure built on land. Of course, the stands 210 are stepped inclined upward from the sports field 220 so as to ensure good visibility.

Furthermore, as shown in FIGS. 2 and 3, the stadium 200 is formed protrudedly from the side surfaces of the body 100. This prevents the width of the body 100 from being unnecessarily increased when the stadium 200 and the body 100 are designed to have the same width as each other.

On the other hand, the sports field 220 of the stadium 200 desirably has a length of 105 m and a width of 68 m, which satisfies FIFA standards for a soccer stadium.

The stadium 200 further includes rooms 201 formed along the edges of the protruded portions thereof, and the rooms 201 are connected to the stands 210.

Accordingly, the cruise ship C has the stadium 200 like the soccer stadium formed on the body 100 thereof, thereby obtaining high values.

That is, the structure of earnings made through sports games like soccer games and performances can be further expanded.

Second Embodiment of the Present Invention

As shown in FIGS. 4 to 8, a cruise ship C' according to a second embodiment of the present invention includes: bodies 100' on which rooms 110' are included; and a stadium 200' having stands 210' and a sports field 220' included thereon.

First, the stadium 200' is comprised of a separate floating body and is separable from the bodies 100', and a body 100 is connected to each side of the stadium 200'.

When a sports game like a soccer game is carried out on the stadium 200', the stadium 200' may be fluctuated due to waves or swells, and therefore, the stadium 200' is connected to the two bodies 100' so as to minimize the fluctuations.

Furthermore, the bodies 100' and the stadium 200' are connected to each other, so that the passengers of the bodies 100' move to the stadium 200' and watch the game or performance carried out on the stadium 200'.

On the other hand, the bodies 100' and the stadium 200' are desirably connected to each other by means of a link structure, so that they can be easily separated from each other.

Contrarily, while the stadium 200' is being not used, it is separated from the bodies 100' and lying at anchor in the harbor.

Besides, since the stadium 200' is comprised of the separate floating body, it further has frames 202' mounted on the inside thereof so as to provide structural stability.

Further, the stadium 200' has open portions 230' formed on both sides facing the bodies 100', and the bodies 100' have the rooms 110' formed on the portions facing the open portions 230' of the stadium 200'.

Accordingly, the passengers of the bodies 100' can watch the sports game or performance conducted on the stadium 200' through the rooms 110' of the bodies 100' facing the open portions 230' of the stadium 200', without moving to the stadium 200', thus improving the conveniences in use.

Further, the stadium 200' is closed on the entire portion thereof except a portion of the center of the top surface and the open portions 230' thereof, thus avoiding the influences caused by wind or the like.

Third Embodiment of the Present Invention

As shown in FIG. 9, a cruise ship C" according to a third embodiment of the present invention includes: a body 100" on which rooms 110" are included; and a stadium 200" having stands 210" and a sports field 220" included thereon.

The structure of the cruise ship C" according to the third embodiment of the present invention is similar to that according to the first embodiment of the present invention.

According to the third embodiment of the present invention, a roof 240" is located along the stands 210" so as to prevent the stands 210" from being exposed to sunlight or rain drops.

The roof 240" has a through-hole portion 241" formed thereon to maintain lighting therein.

In this case, frames 202" are transversely disposed on the through-hole portion 241". The through-hole portion 241" may be openable/closable by means of a separate structure like a cover (not shown), and in this case, the frames 202" support the cover when the through-hole portion 241" is closed so as to provide structural stability.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

For example, the present invention has been described on the soccer stadium, but a variety of sports grounds or fields may be adopted in the present invention, without any limitation thereon.

The invention claimed is:

1. A cruise ship comprising:
first and second bodies on which rooms are included;
a stadium located between the first and second bodies and having stands and a sports field included thereon,
the stadium being comprised of a floating body,
the stadium having a first and a second side,
the first body being connected to the first side of the stadium and the second body being connected to the second side of the stadium so that the stadium and the first and second bodies can be separated from each other;
wherein the stadium has first and second open portions on the first and second sides of the stadium facing the first and second bodies respectively;
wherein at least a portion of the rooms of the first and second bodies face the open portions of the stadium so that a sports game or a performance conducted on the stadium can be watched in said portion of the rooms of the first and second bodies through the open portions of the stadium.

2. The cruise ship according to claim 1, wherein the stadium is enclosed in a shell, said shell coverings the entire stadium except a portion of a center of the stadium and the open portions of the stadium.

3. The cruise ship according to claim 1, wherein the stadium further comprises rooms, wherein a roof is located over the stands and rooms of the stadium.

4. The cruise ship according to claim 3, wherein the roof has a through-hole portion formed thereon.

* * * * *